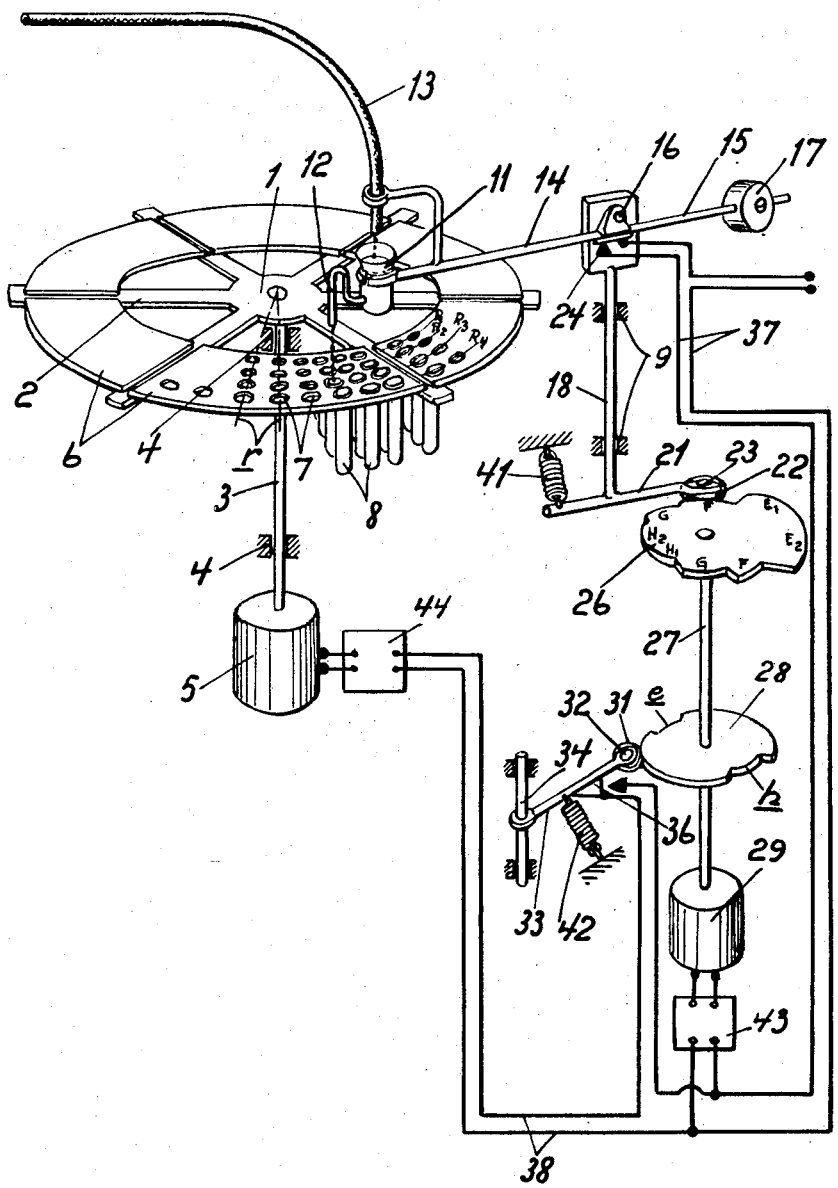

United States Patent Office 2,894,542
Patented July 14, 1959

2,894,542

APPARATUS FOR COLLECTING LIQUID SAMPLES

Rasmus S. Alm, Ljan pr. Oslo, Norway, assignor to LKB-Produkter Fabriksaktiebolag, Stockholm, Sweden, a company of Sweden Application September 17, 1956, Serial No. 610,145

Claims priority, application Great Britain September 30, 1955

5 Claims. (Cl. 141—130)

The present invention relates to an automatic collector for liquid samples, preferably samples obtained in connection with the so-called chromatographic separation methods for liquids.

When carrying out such a separation method, the liquid to be treated is usually allowed to flow through a suitable apparatus for a time which may amount to several days. The liquid leaving the apparatus has to be divided into a number of small portions. For instance, a predetermined amount of liquid or the liquid discharged during a predetermined time has to be collected as a separate portion. To avoid a continuous supervision of the apparatus, automatic sample collectors are used.

Automatic sample collectors are known comprising a rotatable table in the form of an annular disk containing openings for test tubes, see e.g. United States Patent No. 2,493,382. A delivery device is arranged above the table for delivering sample liquid into the test tubes and a driving mechanism is arranged to turn the disk one complete revolution step by step, one circumferential row of test tubes being thereby filled, and then to move the delivery device to the adjacent row of test tubes, and so on.

The collected samples have to be subjected to some treatment, e.g. analyzed, and it is therefore necessary to remove each test tube from the disk by hand, e.g. to a test tube holder.

The present invention comprises an automatic sample collector which permits a plurality of test tubes to be removed simultaneously. The apparatus according to the invention comprises test tubes arranged in a plurality of radially-arranged adjacent rows, a delivery device for delivering sample liquid into said test tubes, and a driving mechanism for moving the delivery device and the test tubes relatively to each other step by step, characterized in that the test tubes are arranged in a plurality of separate holders, each holder containing a plurality of test tube rows, and the driving mechanism is arranged to deliver sample liquid into all the test tubes of one holder in consecutive order before delivering sample liquid into the test tubes of an adjacent holder.

Each holder with its test tubes can, therefore, be treated as a unit. This facilitates the handling of the tubes if, for instance, they have to be moved from the sample collector to a hot cupboard and then analyzed.

The invention will now be further described with reference to the accompanying drawing which shows diagrammatically one form of sample collector according to the invention.

The illustrated device comprises a table 1 which is mounted at its upper end on a shaft 3 which is journalled in bearings 4 and rotated by an electric motor 5. The table 1 is provided with radially directed arms 2 which removably support six test tube holders 6 which are in the form of plates and which together form an annular disk. The holders 6 are provided with openings 7 for test tubes 8, only some of the holes 7 being shown in the drawing. The openings 7 are arranged in radial rows $r$, each radial row containing four openings, and in four circumferential rows $R_1$–$R_4$, each circumferential row of each holder containing eight openings. The holders 6 of the illustrated apparatus thus contain openings for 192 test tubes.

Sample liquid is introduced into the test tubes from a delivery device comprising a cup 11 having a discharge siphon 12. The sample liquid drops steadily into the cup 11 from a flexible tube 13 which is connected e.g. to a filter column which is not shown in the drawing as it does not form part of the invention. When the liquid level in the cup 11 has risen to such an extent that the liquid fills the siphon 12 up to its upper bend, the contents of the cup 11 are automatically discharged through the siphon 12. Thus the delivery device always delivers an equal volume of liquid.

The delivery device 11, 12 is mounted on one arm 14, of a balance, the other arm 15 of which is provided with an adjustable counterweight 17. The counterweight 17 is so adjusted that the arm 14 descends when the cup 11 is filled with liquid and the arm 15 descends when the cup 11 is empty. The balance arms 14, 15 are mounted on a pivot 16 which is supported by the upper end of a vertical shaft 18 rotatably journalled in bearings 9. The balance is arranged to actuate a switch 24 so as to close a circuit 37 when the arm 14 descends and to open said circuit when the arm 15 descends.

The shaft 18 at its lower end has an arm 21 carrying at one end a pin 23 which rotatably supports a roller 22. A helical spring 41 fixed to the other end of the arm is arranged to turn the arm 21 so that the roller 22 engages the periphery of a cam disk 26 which is mounted on the upper end of a vertical shaft 27. The periphery of the cam disk 26 has arcuate portions with different radii, viz. one portion E having the greatest radius, two portions F having a somewhat smaller radius, two portions G having a somewhat smaller radius than the portions F, and a portion H having a somewhat smaller radius than the portions G. Each of the portions F and G encloses an angle of 45°, whereas each of the portions E and H encloses an angle of 90°. The device is so arranged that the siphon 12 is situated above the circumferential test tube row $R_4$ when the roller 22 engages the portion E of the cam disk 26. The portions F, G and H of the cam disk correspond to the test tube rows $R_3$, $R_2$, and $R_1$, respectively.

The shaft 27 is rotated by an electric motor 29 and has provided thereon a second cam disk 28 having a circular periphery except for two diametrically opposite recesses $e$ and $h$. A roller 31 rotatably carried by a pin in 32 on an arm 33 fixed to a rotatable shaft 34 is urged by a helical spring 42 into engagement with the periphery of the cam disk 28. The arm 33 is arranged to actuate a switch 36 to close a circuit 38 when the roller 31 engages the portions $e$ and $h$ of the cam disk 28 and to open the circuit 38 when the roller 31 engages the remaining portion of the cam disk 28.

The cam disks 26 and 28 are so oriented relatively to each other that the roller 31 engages the recess $e$ of the cam disk 28 when the roller 22 engages the mid-point of portion E of the cam disk 26 and the roller 31 engages the recess $h$ of cam disk 28 when roller 22 engages the mid-point of portion H of cam disk 26.

The illustrated apparatus operates in the following manner, it being assumed that the cup 11 has just been emptied through the siphon 12 and the balance arm 15 has then descended so that the switch 24 has opened the circuit 37. Sample liquid continues to drop into the cup 11 and when a sufficient amount of liquid has collected in the cup 11 to cause the balance arm 14 to descend the switch 24 closes the circuit 37 and current is thereby supplied to the motor 29 which is arranged to co-operate with a control unit 43 so as to turn the shaft 27 an angle of 45° and then to stop automatically. The control unit is not described in detail since it is well known per se and does not form part of the invention. When the shaft 27 and consequently the cam disk 26 turns, the roller 22 will engage an adjacent portion of the periphery of the cam disk 26, for instance portion E, instead of portion F as illustrated in the drawing. As a result the shaft 18 and the balance arms 14, 15 are turned to such an extent that the siphon 12 is moved from the circular test tube row $R_3$ to the row $R_4$. When the cup 11 has been filled it is automatically emptied into the test tube situated below the siphon 12, and the described cycle of operations is repeated.

When the roller 22 moves over the portion E of the cam disk 26 it is engaging a portion having the same radius and therefore the shaft 18 and the balance arms do not turn. When the roller 22 moves from portion $E_1$ to portion $E_2$, i.e. the roller 22 is on the mid-point of portion E, the roller 31 engages the portion $e$ of cam disk 28. The switch 36 and the circuit 38 are then closed. Therefore, when the balance arm 14 again descends and the switch 24 closes, current will pass from circuit 37 via circuit 38 to the motor 5 which is arranged to co-operate with a control unit 44 so as to turn the shaft 3 and the table 1 an angle of 7.5° and then to stop automatically.

The table 1 will also be turned an angle of 7.5° when the innermost test tube of one of the rows $r$ has been filled, i.e. when the roller 22 passes from the portion $H_1$ to the portion $H_2$ of the cam disk 26, the roller 31 simultaneously engaging the portion $h$ of the cam disk 28. Thus, the delivery device will describe a zig-zag path relatively to the holders 6, viz. each alternate row $r$ will be filled in the direction from the centre to the periphery of table 1, and each other row will be filled in the direction from the periphery towards the centre.

When all the test tubes of one holder have been filled, the holder may be removed from the arms 2, and the holder and the test tubes may be subjected as a unit to further treatment, e.g. analysis. If a new holder with empty test tubes is inserted, a test may be carried on continuously for an unlimited time.

To facilitate the handling of the holders, they may be provided with feet so that a holder with its test tubes may be supported on a table.

For structural reasons the openings 7 should preferably be situated along straight lines which are radial with respect to the table 1. This necessitates that the arm 14 of the balance be made so long that the path described by the siphon 12 coincides with a row $r$ with the necessary accuracy. If for some reason, e.g. saving of space, it is desired to make the arm 14 shorter, then the rows $r$ must be arranged along the periphery of a circle having a radius equal to the distance from the shaft 18 to the siphon 12.

In the illustrated apparatus an equal volume of liquid is charged into each test tube. The delivery device may also be so arranged as to move step by step at equal time intervals. For instance, the cup 11 may be omitted and the sample liquid allowed to drop directly from the tube 13 into the test tubes. The tube 13 is secured to the outer end of the arm 14 which need not in this constant time interval arrangement be a balance arm but may be rigidly secured to the shaft 18. A timer is connected to the circuit 37 and is arranged to give impulses at equal time intervals for the step-wise movement of the delivery device.

The delivery device may also be arranged so as to deliver a constant number of drops into each test tube, e.g. by means of an electronic drop counter known per se. As long as the surface tension of the sample liquid is constant the size of the drops and consequently the volume of liquid charged into each test tube is constant. During a test, however, the surface tension of the liquid will perhaps vary and consequently the liquid volume charged into the tubes will also vary.

Other devices known for delivering a constant volume or weight of liquid may be employed. These devices, however, do not form part of the invention and are not therefore described.

The sample collector shown in the drawing has only one charging device. The apparatus according to the invention may however be provided with a plurality of charging devices, e.g. two diametrically opposed charging devices or, at the most, as many charging devices as there are test tube holders.

What we claim is:

1. An automatic liquid sample collector comprising a table mounted in fixed bearings for rotation about a vertical axis, a plurality of substantially sector-shaped elements removably connected to said table, each of said elements having means for holding a plurality of receptacles arranged in a plurality of rows outwardly extending with respect to said vertical axis of rotation, a movable delivery device movable successively over all of the receptacles of a first outwardly extending row to deposit sample liquid therein, and means for subsequently rotatably indexing said table to position a subsequent row of receptacles adjacent said delivery device, said delivery device then moving to fill said subsequent row.

2. Apparatus as defined in claim 1 wherein said delivery device traverses successive rows alternately outwardly and inwardly with respect to the axis of rotation of said receptacle holder.

3. Apparatus as defined in claim 1 wherein said means for moving said delivery device and said means for revolving the receptacle holder are operated periodically by cam means.

4. Apparatus as defined in claim 1 wherein said delivery device deposits a uniform volume of sample liquid into each of said receptacles.

5. Apparatus as defined in claim 4 wherein said delivery device comprises a vertical shaft rotatably mounted in fixed bearings, a balance lever pivotally connected intermediate its ends to said shaft, a cup secured to one end of said lever, means for filling said cup with sample liquid, siphon means for emptying said cup, the cup arm of said lever being lowered when said cup is filled and raised when the cup is emptied, and further wherein said means for moving said delivery device across the radial rows includes an electric driving motor and a switch element controlling the operation of said motor, said switch element having a movable contact positioned on said balance arm so that said delivery device will be moved from one receptacle of a row to a subsequent receptacle of said row when the balance lever moves from the raised to the lowered position.

References Cited in the file of this patent
UNITED STATES PATENTS

| | | |
|---|---|---|
| 833,988 | Valerius | Oct. 23, 1906 |
| 2,493,382 | Bell | Jan. 3, 1950 |